United States Patent Office 3,786,076
Patented Jan. 15, 1974

3,786,076
LIPOAMINOACIDS
Jean V. Morelle, 170 Avenue Parmentier,
75 Paris 10eme, France
No Drawing. Continuation-in-part of application Ser. No. 672,975, Oct. 5, 1967. This application Dec. 18, 1969, Ser. No. 886,379
Claims priority, application France, Oct. 13, 1966, 79,767; May 31, 1967, 108,515; Dec. 20, 1968, 179,384
Int. Cl. C08h 3/00
U.S. Cl. 260—402.5
6 Claims

ABSTRACT OF THE DISCLOSURE

Water-insoluble, lipo-soluble composites of alpha-(fatty acid amido) carboxylic acids of the formula

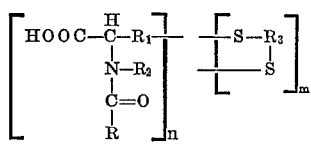

wherein R is an aliphatic hydrocarbon chain of 5–29 carbon atoms; $R_1$ and $R_2$ are hydrogen, an unsubstituted or substituted aliphatic hydrocarbon group wherein the substituents are carboxy, hydroxy, thio, alkylthio, unsubstituted amino, or substituted amino, and $R_1$ and $R_2$ may additionally be lower alkylene when joined together to form a cyclic structure; $R_3$ is lower alkylene; $n=1$ when $m=0$, and $n=2$ when $m=1$. These composites are especially useful in therapeutic, dermatologic, and cosmetic preparations to be applied to human skin for their assistance in penetrating the cutaneous tissues.

---

This application is a continuation-in-part of copending application Ser. No. 672,975, filed Oct. 5, 1967, now abandoned.

This invention relates to composites of acylated alpha-aminoacids, more particularly it relates to composites resulting from the hydrolysis of proteins which are then depeptided and thereafter acylated. The composites of this invention possess interesting properties for use in the therapeutic, dermatologic, and cosmetic fields because of their chemical structure and their combination of water-insolubility and lipo-solubility.

The composites of the present invention are made up of unseparated mixtures of compounds having the formula:

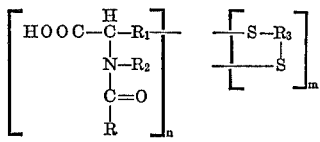

wherein R is an aliphatic hydrocarbon chain of 5–29 carbon atoms, thereby making RCO the acyl groupings from a fatty acid of 6–30 carbon atoms; $R_1$, $R_2$ and $R_3$ are substituents which when incorporated into either of the following formulas:

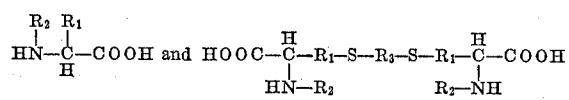

describe all of the alpha-aminoacids, particularly those derived from proteins which are generally thought to include the following:

| | |
|---|---|
| Glycine | Hydroxyproline |
| Alanine | Tryptophan |
| Valine | Glycosamine |
| Leucine | Thyroxine |
| Isoleucine | Lysine |
| Serine | Hydroxylysine |
| Threonine | Arginine |
| Cysteine | Histidine |
| Cystine | Diaminoacetic acid |
| Methionine | Ornithine |
| Phenylalanine | Asparatic acid |
| Tyrosine | Glutamic acid |
| Proline | |

It has been known in the past that aminoacids derived from proteins could be acylated but that acylation has always been performed on isolated aminoacids. Attempts to prepare acrylated protein hydrolyzates without separating their hydrolysis products into isolated aminoacids before acylation has been completely unsuccessful for the purposes of the present invention because peptide linkages remained in the product. This resulted in the production of surface active agents or detergents, generally in the form of sodium salts. It is believed that the complex hydrolyzates produced in the past from protein starting materials contained peptide linkages, thus causing a smaller amount of free carboxyl groups to be present. When such a product was acylated the product was sodium salt of the peptide acrylate which was water-soluble and highly detergent, which, as mentioned above, was unsuitable for the purposes of the present invention.

In accordance with the present invention, there is provided a composite of alpha-(fatty acid amido) carboxylic acids of the formula

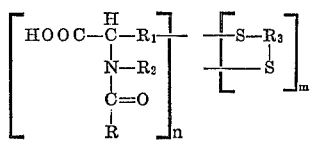

wherein R is an aliphatic hydrocarbon chain of 5–29 carbon atoms; $R_1$ and $R_2$ are hydrogen, an unsubstituted or substituted aliphatic hydrocarbon group wherein the substituents are carboxy, hydroxy, thio, alkylthio, unsubstituted amino, or substituted amino, and $R_1$ and $R_2$ may additionally be lower alkylene when joined together to form a cyclic structure; $R_3$ is lower alkylene; $n=1$ or 2 and $m=0$ or 1 provided that $n=1$ when $m=0$, and $n=2$ when $m=1$.

The composites of this invention are preferably prepared by the step-wise process of (1) hydrolyzing a protein to produce a hydrolyzate, (2) removing the peptides from the hydrolyzate by a known method, such as for example, the method analogous to that described in U.S. Pat. 2,429,666, for the separation of aminoacids from each other or the method generally described in the examples hereinafter set forth, (3) acylating the depeptided hydrolyzate with a fatty acid or a fatty acid halide to produce a mixture of lipopoly(alpha-aminoacid) salts, and (4) treating these salts with a strong acid or a cationic ion exchange resin to obtain a mixture of the corresponding acids. The term "lipopoly(alpha-aminoacid)" is intended to describe a compound of this invention, the prefix "lipo" referring to the fatty acid component and the term "poly(alpha-aminoacid)" referring to a plurality of alpha-aminoacids. The composite of this invention is therefore a mixture of acylated aminoacids wherein the basic functions of the aminoacids have been blocked by the acylate (RCO—) radicals and the carboxyl groups of the aminoacids are free. It is these compounds which are herein referred to as "lipopoly (alpha-aminoacids)."

The products of the present invention are particularly suitable for use in fields of therapeutics, dermatology, and cosmetics since they are lipo-soluble and their structure is similar to the structures of human skin. These properties provide the products with the capability of penetrating very easily through the cutaneous tissues of the skin; for example, a typical preparation is able to penetrate the skin after less than one minute of massage. Furthermore, it has been found that the products of the present invention are useful in promoting skin regeneration by providing the various aminoacids which are useful for this purpose.

The products of the present invention are preferably prepared in a four-step process as described above. The first of these steps is the hydrolysis of a protein such as casein, collagen, keratin, yeast, animal skins, and the like. The hydrolysis is carried out by employing conventional methods using an inorganic acid, preferably hydrochloric acid, and at a temperature which is low enough to minimize the degradation of the aminoacids and yet high enough to provide a suitable reaction time. Such temperature may be from about 80° to about 130° C. but preferably is in the range of 95° to 105° C. Other acids which may be employed in this process include sulphuric, phosphoric, nitric, and the like. The reaction time for this step in the process is normally a matter of several hours, e.g. ten or more. The product of this step is termed a "protein hydrolyzate."

The second step in the process is to depeptidize the protein hydrolyzate. The foregoing hydrolysis step is intended to break the peptide linkages in protein and to produce thereby a series of alpha-aminoacids but since this reaction does not always go to completion, there usually are some unhydrolyzed portions called "peptides" in the protein hydrolyzate. In this second step of the process a practical separation is effected between the peptides and the composite of alpha-aminoacids. This separation may be accomplished by any of several known methods. One of such methods is that described in U.S. Pat. 2,429,666, which comprises passing the protein hydrolyzate through a cation exchange resin in the presence of a mineral acid and removing and separating fractions from the effluent of that step. Another method for depeptidization is described in the examples which follow.

The third step in the process is to acylate the depeptided protein hydrolyzate. This step is carried out by treatment of the depeptided hydrolyzate with a fatty acid or its functional equivalent, i.e. a fatty acid halide. The acids or the acid halides, the preferred halide being chloride, are those which contain six to 30 carbon atoms and may be saturated or unsaturated. Among these acids may be mentioned caproic, enanthic, caprylic, pelargonic, capric, undecanoic, lauric, tridecanoic, myristic, pentadecanoic palmitic, margaric, stearic, nonadecanoic, eicosanoic, heneicosanoic, behenic, tricosanoic, lignocenic, pentacosanoic, cerotic, heptacosanoic, octacosanoic, nonacosanoic, triacontanoic, undecenoic, myristoleic, palmitoleic, oleic, erucic, and the like. It is intended of course, that the naming of the foregoing acids includes the naming of their halides, such as chlorides, bromides, iodides, and fluorides, chlorides being the preferred halide. In general the reaction takes place at ordinary temperatures, for example, 20°–60° C. and the pH is maintained on the alkaline side, i.e. at about 7.5 to 10 by the addition of a suitable material such as sodium hydroxide, ethyl chlorocarbonate, and the like. The reaction time varies with temperature but may require from about 15 minutes to about 60 minutes. This reaction causes the amine groups, the alcoholic hydroxyl groups, the phenolic groups, and the imidazolic groups to be blocked by reaction with the fatty acid or its halide.

The acylation reaction may be considered to proceed generally as follows:

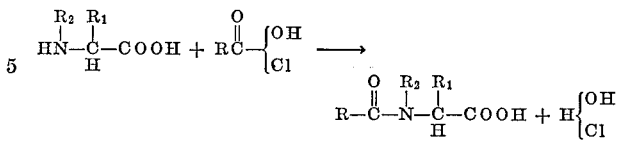

If the acylating agent is a free acid the by-product of the equation is water and if on the other hand, the acylating agent is an acid chloride, the by-product is hydrogen chloride. In order to displace this reaction to the right, the by-product water or hydrogen chloride should be removed as quickly as it is formed, which explains the reason for employing an alkaline material when hydrogen chloride is the by-product. If sodium hydroxide is employed as the alkaline agent it also tends to react with the acylating agent thus making it necessary to employ a stoichiometric excess of the acrylating agent to provide enough for the principal reaction, for the reaction with the alkaline agent, and to force displacement of the reaction to the right.

The final step in the process is to treat the acylation product with a strong mineral acid such as hydrogen chloride and/or treatment with an ion exchange resin. In one embodiment of this invention, the acylated mixture is acidified with hydrogen chloride and the composite of alpha-aminoacids accumulates as an upper layer, since it is insoluble in water, while the remaining material which is soluble remains in the aqueous layer.

In order to more fully understand the present invention there are provided detailed examples in which the lipopoly (α-aminoacid) are prepared. In general, the time, temperature, and other reaction conditions have been selected to give the best possible yield for each reaction. It is understood that modifications of these conditions can be made by those skilled in the art without deviating from the spirit of this invention. Parts and percentages are by weight and temperatures are in degrees centigrade unless otherwise specified.

EXAMPLE 1

Preparation of the hydrolyzate

Casein is treated by a 6–8 N solution of hydrochloric acid at a temperature of 95°–105° C. for a period of 10–40 hours. The reaction mixture is then bleached by use of an appropriate material, such as a carbon black, and filtered to separate the bleaching agent and any organic residues. The filtrate is a limpid, light yellow solution containing a mixture of the alpha-aminoacids derived from casein and one short peptide (2–3 carbon atoms).

Depeptidization

The solution from the previous step is diluted several times with water and passed through a cation exchange resin. The resin is then eluted with a normal ammoniated solution. A liquid product is obtained which contains from about 1% to 20% by weight of depeptided alpha-aminoacids at a pH of about 8–11. The percentage concentration of depeptided alpha-aminoacids depends on the amount of solution used in the elution step. The peptides remain in the ion exchange resin.

Acylation (a) By acid chloride.—To the solution containing depeptided alpha-mainoacids these is added 1.4 to 1.8 times the stoichiometric quantity of palmitic acid chloride. This acid chloride is added slowly while the solution is agitated at a temperature of 20°–60° C. and the pH of the solution is maintained at a value above 9 by the addition of sodium hydroxide solution. At the end of the addition of the acid chloride (which takes about 30 minutes) agitation is continued at the same temperature conditions for 30–60 minutes more.

(b) By the free acid.—To the solution of depeptided alpha-aminoacids there is added concentrated sodium hydroxide until a concentration of 2 N is obtained and the solution is then chilled to a temperature between —5° and —10° C. A solution containing the stoichiometric amount of palmitic acid dissolved in ten times its volume of tetrahydrofuran is prepared, to which is added, by reference to the volum eof the acid, 0.5 part of ethyl chlorocarbonate and 0.7 part of triethylamine. This solution of palmitic acid is then likewise cooled to a temperature between —5° and —10° C. and slowly poured into the solution containing the depeptided alpha-aminoacids. The two solutions are mixed by agitation and the resulting mixture is cooled to prevent any rise in temperature during this step.

Recovery of product

The composite of acylated alpha-aminoacids is recovered in the same manner whether the acylation agent is an acid chloride or a free acid. In either event the acylation mixture is acidified with an acid such as hydrogen chloride and the composite acylate which is insoluble in water accumulates as a layer on top of the aqueous layer. After decanting the supernatant layer, it is washed with water several times and then with benzene or other solvent to remove the last portions of palmitic acid or its chloride which may be present. The washed material is then steamed in a vacuum at a temperature of 50° C. and the composite of alpha-aminoacids derived from casein and acylated with palmitic acid is recovered containing a maximum of about 20% by weight water (normally 5–10%). The product has a melting point of 46–29° C.

In general these composites may be dehydrated by heating to 100° C. for several minutes although care must be exercised to make sure that the composites do not begin to decompose during this step. These materials generally contain a certain amount of "bound water" which is indispensible to maintain their stability. Frequently, composites with a fixed melting point are obtained by the above processes.

EXAMPLES 2–8

The procedure of Example 1 was repeated except that different proteins and different acylating agents were employed. Collagen and keratin were employed as the protein and as the acylating agents there was employed palmitic acid, palmitic acid chloride, lauric acid, lauric acid chloride, stearic acid, stearic acid chloride, oleic acid, and oleic acid chloride. The physical properties of the composites obtained are listed below in Table I.

TABLE I

| Example | Components of composite | | Melting points, ° C. | |
|---|---|---|---|---|
| | Protein | Acylating agent | After dehydration | Before dehydration |
| 2 | Collagen | Palmitic acid or its chloride | 69–71 | 50–52 |
| 3 | Keratin | do | 47–49 | 48–50 |
| 4 | Collagen | Lauric acid or its chloride | | 20–22 |
| 5 | Keratin | do | | 22–24 |
| 6 | Collagen | Stearic acid or its chloride | | 52–54 |
| 7 | Keratin | do | | 54–56 |
| 8 | Collagen | Oleic acid or its chloride | | 5–10 |

EXAMPLE 9

A cream preparation was made of the following components:

| | Parts |
|---|---|
| Composite of Example 2 | 100.0 |
| Stearic acid | 37.5 |
| Emulsifying agent | 60.0 |
| Isopropyl palmitate | 45.0 |
| Cetyl alcohol | 2.5 |
| 5-chloro-8-hydroxyquinoline | 2.5 |

Water in sufficient amount to bring the total to 1000.0 parts.

This preparation was found to be beneficial in treating the skin of patients suffering from aczema, necrosis, acne, itchiness, dry skin and burns.

What is claimed is:

1. A water-insoluble, peptide free lipo-soluble mixture of alpha-(fatty acid amido) carboxylic acids of the formula

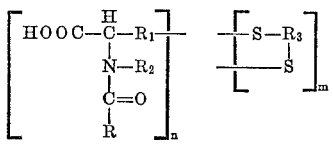

wherein R is an aliphatic hydrocarbon chain of 5–29 carbon atoms; $R_1$ and $R_2$ are hydrogen, an unsubstituted or substituted aliphatic hydrocarbon group wherein the substituents are carboxy, hydroxy, thio, alkylthio, unsubstituted amino, or substituted amino, and $R_1$ and $R_2$ may additionally be lower alkylene when joined together to form a cyclic structure; $R_3$ is lower alkylene; $n=1$ or 2 and $m=0$ or 1 wherein $n=1$ when $m=0$; and $n=2$ when $m=1$.

2. The mixture of claim 1 wherein said alpha-(fatty acid amido) carboxylic acids are derived from alpha-aminoacids selected from the group consisting of glycine, alanine, valine, leucine, isoleucine, serine, threonine, cysteine, cystine, methionine, phenylalanine, throsine, proline, hydroxypropline, tryptophan, glycosamine, thyroxine, lysine, hydroxylysine, arginine, histidine, diaminoacetic acid, ornithine, aspartic acid, and glutamic acid.

3. A process for preparing the mixture of claim 1 which comprises:
(a) hydrolyzing a protein with any inorganic acid to produce a protein hydrolyzate;
(b) separating a mixture of alpha-aminoacids from incompletely hydrolyzed portions of said hydrolyzate;
(c) acylating said mixture of alpha-aminoacids by reaction with a fatty acid or its halide containing 6–30 carbon atoms per molecule to produce a mixture of lipo-poly(alpha-aminoacid) salts; and
(d) reacting said mixture of salts with a strong acid or a cationic ion exchange resin to produce a mixture of lipo-poly(alpha-aminoacids).

4. The process of claim 3 wherein said protein is selected from the group consisting of casein, collagen, keratin, yeast, and animal skins.

5. The process of claim 3 wherein said alpha-aminoacids are selected from the group described in claim 2.

6. The mixture of claim 1 which is the result of the acylation of depeptided collagen by palmitic acid.

References Cited

UNITED STATES PATENTS

| 3,624,114 | 11/1971 | Morelle | 260—402.5 |
| 2,728,759 | 12/1955 | Keil | 260—112 |
| 2,729,657 | 1/1956 | Krems | 260—404 |
| 3,107,252 | 10/1963 | Lubowe | 260—309.5 |
| 2,598,341 | 5/1952 | Blish | 260—529 |
| 2,685,601 | 8/1954 | Buck et al. | 260—529 |

ELBERT L. ROBERTS, Primary Examiner

U.S. Cl. X.R.

260—404; 424—319